(12) United States Patent
Jo et al.

(10) Patent No.: US 11,656,431 B2
(45) Date of Patent: May 23, 2023

(54) IMAGING LENS SYSTEM AND CAMERA MODULE

(71) Applicant: Samsung Electro-Mechanics Co., Ltd., Suwon-si (KR)

(72) Inventors: Yong Joo Jo, Suwon-si (KR); Hag Chul Kim, Suwon-si (KR); Hyo Jin Hwang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 337 days.

(21) Appl. No.: 16/788,780

(22) Filed: Feb. 12, 2020

(65) Prior Publication Data
US 2021/0109321 A1 Apr. 15, 2021

(30) Foreign Application Priority Data
Oct. 14, 2019 (KR) .......................... 10-2019-0127269

(51) Int. Cl.
*G02B 9/60* (2006.01)
*G02B 13/00* (2006.01)
*H04N 5/225* (2006.01)

(52) U.S. Cl.
CPC ........... *G02B 9/60* (2013.01); *G02B 13/0045* (2013.01); *H04N 5/2254* (2013.01)

(58) Field of Classification Search
None
See application file for complete search history.

(56) References Cited

U.S. PATENT DOCUMENTS

| 7,400,462 | B2 | 7/2008 | Chen |
| 7,576,930 | B2 | 8/2009 | Yu |
| 8,928,996 | B2 | 1/2015 | Kang et al. |
| 11,415,776 | B2* | 8/2022 | Yoo ..................... G02B 13/004 |
| 2012/0087019 | A1 | 4/2012 | Tang et al. |
| 2013/0010174 | A1 | 1/2013 | Shinohara et al. |
| 2013/0314802 | A1* | 11/2013 | Uno ....................... G02B 7/102 |
| | | | 359/700 |
| 2014/0300975 | A1 | 10/2014 | Tsai et al. |
| 2015/0185446 | A1 | 7/2015 | Hsu et al. |

(Continued)

FOREIGN PATENT DOCUMENTS

| CN | 108663777 A | 10/2018 |
| CN | 110174746 A | 8/2019 |

(Continued)

OTHER PUBLICATIONS

Taiwanese Office Action dated May 21, 2020 in corresponding Taiwanese Patent Application No. 109105300 (12 pages in English, 14 pages in Taiwanese).

(Continued)

*Primary Examiner* — Darryl J Collins
(74) *Attorney, Agent, or Firm* — NSIP Law

(57) ABSTRACT

A camera module includes a first lens having positive refractive power; a second lens having refractive power; a third lens having positive refractive power, and having a concave shape on an image side surface; a fourth lens having negative refractive power; and a fifth lens having refractive power. TTL, a distance from an object side surface of the first lens to an imaging surface and BFL, a distance from an image side surface of the fifth lens to the imaging surface satisfy 1.0<TTL/BFL<3.0.

19 Claims, 9 Drawing Sheets

(56) References Cited

U.S. PATENT DOCUMENTS

| | | |
|---|---|---|
| 2016/0223791 A1 | 8/2016 | Hsieh et al. |
| 2017/0351064 A1* | 12/2017 | Chang .................. G02B 9/60 |
| 2018/0143403 A1* | 5/2018 | Tseng ................ G02B 13/0045 |
| 2018/0188501 A1 | 7/2018 | Lee et al. |
| 2018/0224623 A1 | 8/2018 | Lin |
| 2018/0284394 A1 | 10/2018 | Chen et al. |
| 2018/0364455 A1 | 12/2018 | Chen et al. |
| 2019/0146187 A1 | 5/2019 | Wang |
| 2020/0285025 A1 | 9/2020 | Jhang et al. |
| 2020/0409036 A1 | 12/2020 | Wang et al. |

FOREIGN PATENT DOCUMENTS

| | | |
|---|---|---|
| CN | 110174752 A | 8/2019 |
| CN | 110320647 A | 10/2019 |
| JP | 2015-165338 A | 9/2015 |
| KR | 10-2018-0077609 A | 7/2018 |
| TW | 200807049 A | 2/2008 |
| TW | 201331618 A1 | 8/2013 |
| TW | 201416754 A | 5/2014 |
| TW | 201629572 A | 8/2016 |
| TW | 201841014 A | 11/2018 |
| TW | 201905531 A | 2/2019 |
| TW | I681206 B | 1/2020 |

OTHER PUBLICATIONS

Chinese Office Action dated Jan. 26, 2022, in counterpart Chinese Patent Application No. 202010337670.8 (6 pages in English and 8 pages in Chinese).

Taiwanese Office Action dated Dec. 15, 2020 issued in counterpart Taiwanese Patent Application No. 109105300. (10 pages in English)(11 pages in Taiwanese).

Taiwanese Office Action dated Sep. 21, 2020 in counterpart Taiwanese Patent Application No. 109105300, (11 pages in English and 11 pages in Taiwanese).

Taiwanese Office Action dated Feb. 25, 2022, in counterpart Taiwanese Patent Application No. 110118839 (8 pages in English and 10 pages in Mandarin).

\* cited by examiner

IMAGING LENS SYSTEM AND CAMERA MODULE

CROSS-REFERENCE TO RELATED APPLICATION

This application claims the benefit under 35 USC 119(a) of Korean Patent Application No. 10-2019-0127269, filed on Oct. 14, 2019 with the Korean Intellectual Property Office, the entire disclosure of which is incorporated herein by reference for all purposes.

BACKGROUND

1. Field

The following description relates to a camera module capable of varying an optical axis length and a lens imaging system mountable in such a camera module.

2. Description of Background

A portable terminal commonly includes a camera module. For example, a portable wireless terminal may include one or more camera modules. Each camera module may have a predetermined size. For example, a camera module may have a size corresponding to a distance from a lens closest to an object to an image side surface (or an image sensor), known as a total track length (TTL). The TTL of the camera module is usually proportional to a focal length. For example, a camera module for near-distance imaging may have a shorter TTL than a conventional camera module. As another example, a camera module for long-distance imaging may have a longer TTL than a conventional camera module. However, since the portable wireless terminal has a limited installation space, it may be difficult to mount a camera module for long-distance imaging or a camera module capable of magnification control of an image (a zoom-enabled camera module).

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A lens imaging system capable of long-distance imaging while being mounted on a portable terminal, and a camera module including the same.

In one general aspect, a camera module includes: a first lens having positive refractive power; a second lens having refractive power, a third lens having positive refractive power, and having a concave shape on an image side surface; a fourth lens having negative refractive power; and a fifth lens having refractive power. TTL, a distance from an object side surface of the first lens to an imaging surface, and BFL, a distance from an image side surface of the fifth lens to the imaging surface, satisfies $1.0<TTL/BFL<3.0$.

The first lens may have a convex image-side surface.
The third lens may have a convex object-side surface.
The fifth lens may have a concave image-side surface.
A radius of curvature of an image side surface of the first lens L1 R2 and a focal length f of the lens imaging system may satisfy $-10<L1R2/f<-2.0$.

A radius of curvature of the object-side surface of the first lens L1 R1 and a radius of curvature of an image-side surface of the first lens L1 R2 may satisfy $-2.0<(L1R1+L1R2)/(L1R1-L1R2)<-0.1$.

A radius of curvature of an image side surface of the second lens L2R2 and a focal length f of the lens imaging system may satisfy $0.1<L2R2/f<2.0$.

A radius of curvature of an object side surface of the second lens L2R1 and a radius of curvature of an image side surface of the second lens L2R2 may satisfy $0.1<(L2R1+L2R2)/(L2R1-L2R2)<5.0$.

The BFL and a diagonal length 2 lmgHT of the imaging surface may satisfy $1.0<BFL/2$ lmgHT.

A total field of view (FOV) may be 35 degrees or less.

A focal length f of the lens imaging system and a diagonal length 2 lmgHT of the imaging surface may satisfy $1.6<f/2$ lmgHT.

The fifth lens may have positive refractive power.

In another general aspect, a camera module includes a first barrel including a lens imaging system; and a second barrel coupled to the first barrel, and including an image sensor. The first barrel is accommodated inside the second barrel in an optical axis direction of the lens imaging system.

The lens imaging system may include a first lens having positive refractive power; a second lens having refractive power; a third lens having positive refractive power, and including a concave image-side surface; a fourth lens having negative refractive power; and a fifth lens having refractive power. TTL, a distance from an object-side surface of the first lens to an imaging surface, and BFL, a distance from an image-side surface of the fifth lens to the imaging surface, may satisfy $1.0<TTL/BFL<3.0$.

A length of the first barrel in the optical axis direction may be greater than a distance from the object side surface of the first lens to the image side surface of the fifth lens.

In another general aspect, a camera module includes a first lens barrel; a second lens barrel coupled to an image side of the first barrel; a lens imaging system accommodated within the first lens barrel and the second lens barrel; and a third lens barrel including an image sensor, and accommodating the first lens barrel and the second lens barrel therein. The lens imaging system includes a first lens having refractive power; a second lens having refractive power; a third lens having refractive power; a fourth lens having refractive power; and a fifth lens having refractive power. TTL, a distance from an object-side surface of the first lens to an imaging surface, and BFL, a distance from an image-side surface of the fifth lens to the imaging surface, satisfies $1.0<TTL/BFL<3.0$.

The first lens, the second lens, and the third lens may be accommodated in the first lens barrel, and the fourth lens and the fifth lens may be accommodated in the second lens barrel.

A length of the first lens barrel in an optical axis direction may be greater than a distance from the object-side surface of the first lens to an image-side surface of the third lens.

A length of the second lens barrel in an optical axis direction may be greater than a distance from an object-side surface of the fourth lens to the image-side surface of the fifth lens.

A length of the third lens barrel in an optical axis direction may be greater than BFL.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
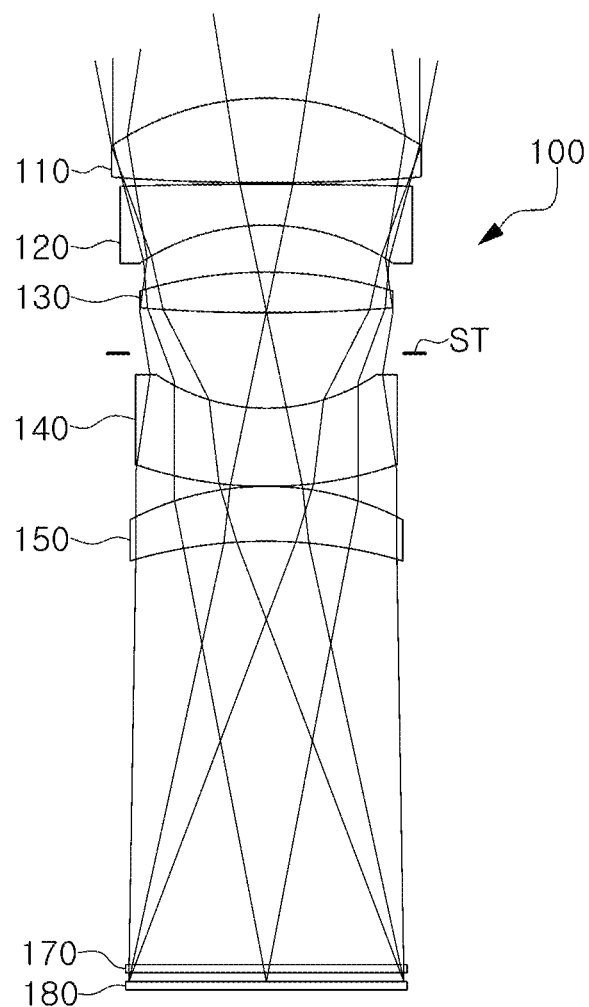
FIG. 1 is a configuration diagram of a lens imaging system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described as follows with reference to the attached drawings.

Herein, a first lens refers to a lens closest to an object (or a subject), and a fifth lens refers to a lens closest to an imaging surface (or an image sensor). Herein, a unit of a curvature of radius, a thickness, TTL, 2 ImgHT (a diagonal length of the imaging surface), and a focal length of the lens may be in millimeters (mm). In addition, the thickness of the lens, an interval between the lenses, and the TTL is a distance from an optical axis of the lens. In addition, in an explanation of a shape of each lens, a convex shape on one surface may mean an optical axis portion of the surface is convex, and a concave shape of one surface may mean an optical axis portion of the surface is concave. Therefore, even when one surface of the lens is described as having a convex shape, an edge portion of the lens may be concave. Similarly, even when one surface of the lens is described as having a concave shape, an edge portion of the lens may be convex.

The lens imaging system includes an optical system comprised of a plurality of lenses. For example, the optical system of the lens imaging system is comprised of a plurality of lenses having refractive power. However, the lens imaging system is not comprised of only lenses having refractive power. For example, the lens imaging system may include a stop ST for adjusting an amount of light. In addition, the lens imaging system may include an infrared cut filter for blocking infrared rays. In addition, the lens imaging system may further include an image sensor (i.e., an imaging device) for converting an image of a subject incident through the optical system into an electrical signal. In addition, the lens imaging system may further include a gap maintenance member for adjusting the distance between the lens and the lens.

A plurality of lenses is made of materials having different refractive indexes from air. For example, the plurality of lenses is made of plastic or glass materials. At least one of the plurality of lenses has an aspherical shape. The aspherical surface of the lens is represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Equation 1

In Equation 1, c is a reciprocal of a radius of curvature of the lens, k is a conical constant, r is a distance from any point on an aspherical surface to an optical axis, A through J are aspherical surface constants, and Z (or SAG) is a height in an optical axis direction from any point on an aspheric surface to an apex of the aspheric surface.

The lens imaging system includes five or more lenses. For example, the lens imaging system includes a first lens, a second lens, a third lens, a fourth lens, and a fifth lens, sequentially disposed from an object side.

The first lens to the fifth lens may be disposed at intervals from neighboring lenses. For example, an image side surface of the first lens may not contact an object side surface of the second lens, and an image side surface of the second lens may not contact an object side surface of the third lens.

The first lens has predetermined refractive power. For example, the first lens may have positive refractive power. The first lens has a convex shape on one surface. For example, the first lens may have a convex shape on an image side surface. The first lens has a predetermined refractive index. For example, the first lens may have a refractive index of 1.6 or more. The first lens has a predetermined focal length. For example, the focal length of the first lens may be in a range of 7.0 to 9.0 mm.

The second lens has predetermined refractive power. For example, the second lens may have negative refractive power. The second lens has a concave shape on one surface. For example, the second lens may have a concave shape on an image side surface. The second lens has a predetermined refractive index. For example, the second lens may have a refractive index of 1.0 or more and less than 1.6. The second lens has a predetermined focal length. For example, the focal length of the second lens may be in a range of −10 to −7.0 mm.

The third lens has predetermined refractive power. For example, the third lens has a concave shape on one surface. For example, the third lens may have a concave shape on an image side surface. The third lens has a predetermined refractive index. For example, the third lens may have a refractive index of 1.6 or more and less than 1.8. The third lens has a predetermined focal length. The focal length of the third lens may be in a range of 30 to 100 mm.

The fourth lens has predetermined refractive power. For example, the fourth lens may have negative refractive power. The fourth lens has a convex shape on one surface.
For example, the fourth lens may have a convex shape on an image side surface. The fourth lens has a predetermined refractive index. For example, the fourth lens may have a refractive index of 1.6 or more and less than 1.8. The fourth lens has a predetermined focal length. For example, the focal length of the fourth lens may be in a range of −30 to −15 mm.

The fifth lens has predetermined refractive power. For example, the fifth lens may have positive or negative refractive power. The fifth lens may have a concave shape on one surface. For example, the fifth lens may have a concave shape on an image side surface. The fifth lens has predetermined refractive power. For example, the fifth lens may have refractive power of 1.5 or more and less than 1.8. The fifth lens has a predetermined focal length. For example, the focal length of the fifth lens may be in a range of 12 to 24 mm.

The lens imaging system includes a lens of a plastic material. For example, in the lens imaging system, at least one of five or more lenses constituting a lens group may be made of a plastic material.

The lens imaging system includes an aspherical lens. For example, in the lens imaging system, at least one of five or more lenses constituting the lens group may be an aspherical lens.

The lens imaging system may include a filter, a stop, and an image sensor.

The filter is disposed between a lens disposed closest to the imaging surface and the image sensor. The filter blocks some wavelengths of light from incident light to improve a resolution of the lens imaging system. For example, the filter may block infrared light wavelengths of the incident light. The stop maybe disposed between the third lens and the fourth lens.

The lens imaging system may satisfy one or more of the following conditional expressions:

$1.0 < TTL/BFL < 3.0$;

$-10.0 < L1R2/f < -2.0$;

$-2.0 < (L1R1 + L1R2)/(L1R1 - L1R2) < -0.1$;

$0.1 < L2R2/f < 2.0$;

$0.1 < (L2R1 + L2R2)/(L2R1 - L2R2) < 5.0$;

$0.1 < f/f1 < 5.0$;

$0.1 < f/f3 < 2.0$;

$-2.0 < f/f4 < -0.1$; and $0.1 < f/f5 < 2.0$, where TTL is a distance from an object side surface of the first lens to an imaging surface, BFL is a distance from an image side surface of the fifth lens to an imaging surface, f is a focal length of the lens imaging system, L1R1 is a radius of curvature of the object side surface of the first lens, L1R2 is a radius of curvature of the image side surface of the first lens, L2R1 is a radius of curvature of the object side surface of the second lens, L2R2 is a radius of curvature of the image side surface of the second surface, f1 is a focal length of the first lens, f3 is a focal length of the third lens, f4 is a focal length of the fourth lens, and f5 is a focal length of the fifth lens.

In addition, the lens imaging system may further satisfy one or more the following conditional expressions:

$1.0 < BFL/2$ $ImgHT$;

$1.6 < f/2$ $ImgHT$;

$1.0 < TTL/f < 1.2;$ $0.8 < (TTL-BFL)/BFL < 1.1;$ $D23/D34 < 1;$ $T5 < T4 < T1;$ $\max(|1/f2|,|1/f3|,|1/f4|,|1/f5|) < |1/f1|;$ and $FOV < 35,$ where 2 ImgHT is a diagonal length of the imaging surface, D23 is a distance from the image side surface of the second lens to the object side surface of the third lens, D34 is a distance from the image side surface of the third lens to the object side surface of the fourth lens, T1 is a thickness at a center of an optical axis of the first lens, T4 is a thickness at a center of an optical axis of the fourth lens, T5 is a thickness at a center of an optical axis of the fifth lens, max( ) indicates the largest value listed in parentheses, and FOV is a total field of view of the lens imaging system.

Next, a lens imaging system according to various examples will be described.

A lens imaging system according to a first example will be described with reference to FIG. 1.

A lens imaging system 100 includes a first lens 110, a second lens 120, a third lens 130, a fourth lens 140, and a fifth lens 150.

The first lens 110 has positive refractive power. The first lens 110 has a convex shape on an object side surface and a convex shape on an image side surface. The second lens 120 has negative refractive power. The second lens 120 has a convex shape on an object side surface and a concave shape on an image side surface. The third lens 130 has positive refractive power. The third lens 130 has a convex shape on an object side surface and a concave shape on an image side surface. The fourth lens 140 has negative refractive power.

side of the filter 170. The image sensor 180 is configured to convert an optical signal into an electrical signal.

Table 1 shows lens characteristics of the lens imaging system 100, and Table 2 shows aspherical values of the lens imaging system 100.

TABLE 1

| Surface No. | Reference | Radius of curvature | Thickness/ distance | Focal length | Refractive index | Abbe number |
|---|---|---|---|---|---|---|
| 0 | Object | infinity | infinity | | | |
| 1 | First lens | 4.450 | 1.61828 | 7.93099 | 1.5350 | 56.00 |
| 2 | | −85.103 | 0.06000 | | | |
| 3 | Second lens | 9.340 | 1.12000 | −8.85139 | 1.6150 | 25.90 |
| 4 | | 3.300 | 1.00000 | | | |
| 5 | Third lens | 17.950 | 0.58349 | 35.85586 | 1.6600 | 20.40 |
| 6 | | 70.482 | 1.60000 | | | |
| 7 | Fourth lens | −3.300 | 1.40000 | −19.29506 | 1.6150 | 25.90 |
| 8 | | −5.190 | 0.04000 | | | |
| 9 | Fifth lens | 3.651 | 1.20000 | 17.36149 | 1.5350 | 56.00 |
| 10 | | 5.199 | 7.20242 | | | |
| 11 | Filter | infinity | 0.11000 | | 1.5441 | 56.00 |
| 12 | | infinity | 0.87054 | | | |
| 13 | Imaging surface | infinity | 0.00020 | | | |

TABLE 2

| Surface No. | K | A | B | C | D | E | F | G | H | I |
|---|---|---|---|---|---|---|---|---|---|---|
| 1 | −0.61556653 | 0.000838186 | 2.08291E−05 | 4.32584E−06 | −4.64091E−07 | 3.62323E−08 | 0 | 0.00E+00 | 0.00E+00 | 0.00E+00 |
| 2 | 0.00E+00 | 6.22E−05 | −5.78E−06 | 3.53684E−06 | −4.65702E−07 | 2.8652E−08 | 0.00E+00 | 0.00E+00 | 0.00E+00 | 0.00E+00 |
| 3 | 0.00E+00 | −4.04E−03 | 7.95822E−05 | 9.36203E−07 | −2.07702E−07 | 0 | 0.00E+00 | 0.00E+00 | 0.00E+00 | 0.00E+00 |
| 4 | 0.00E+00 | −5.30E−03 | 0.00016213 | −1.30902E−05 | −4.56916E−06 | 0 | 0.00E+00 | 0.00E+00 | 0.00E+00 | 0.00E+00 |
| 5 | 0.00E+00 | 1.57E−03 | 0.001414701 | −0.000284243 | 2.44754E−05 | 0 | 0.00E+00 | 0.00E+00 | 0.00E+00 | 0.00E+00 |
| 6 | 0.00E+00 | 3.74E−04 | −0.001382994 | −0.000620431 | 8.74698E−05 | −6.52082E−06 | 0.00E+00 | 0.00E+00 | 0.00E+00 | 0.00E+00 |
| 7 | 0.00E+00 | 2.19E−02 | −0.005259913 | 0.000825143 | −5.50761E−05 | −3.51393E−06 | 0.00E+00 | 0.00E+00 | 0.00E+00 | 0.00E+00 |
| 8 | −5.40E+00 | 1.97E−03 | −0.000675279 | 0.00025125 | −7.31796E−06 | −1.39381E−06 | 0.00E+00 | 0.00E+00 | 0.00E+00 | 0.00E+00 |
| 9 | 0.00E+00 | −1.41E−02 | 0.001855935 | −6.50915E−05 | −4.06056E−06 | 2.54792E−07 | 0.00E+00 | 0.00E+00 | 0.00E+00 | 0.00E+00 |
| 10 | 0.00E+00 | −7.08E−03 | 0.000840088 | −4.19774E−05 | 8.41651E−06 | −3.04125E−07 | 0.00E+00 | 0.00E+00 | 0.00E+00 | 0.00E+00 |

The fourth lens 140 has a concave shape on an object side surface and a convex shape on an image side surface. The fifth lens 150 has positive refractive power. The fifth lens 150 has a convex shape on an object side surface and a concave shape on an image side surface.

The first lens 110 may be the thickest lens in the lens imaging system 100. For example, the thickness at the center of the first lens 110 along the optical axis may be greater than the thickness at the center of the second lens 120 to the fifth lens 150 along the optical axis.

Figure 2:
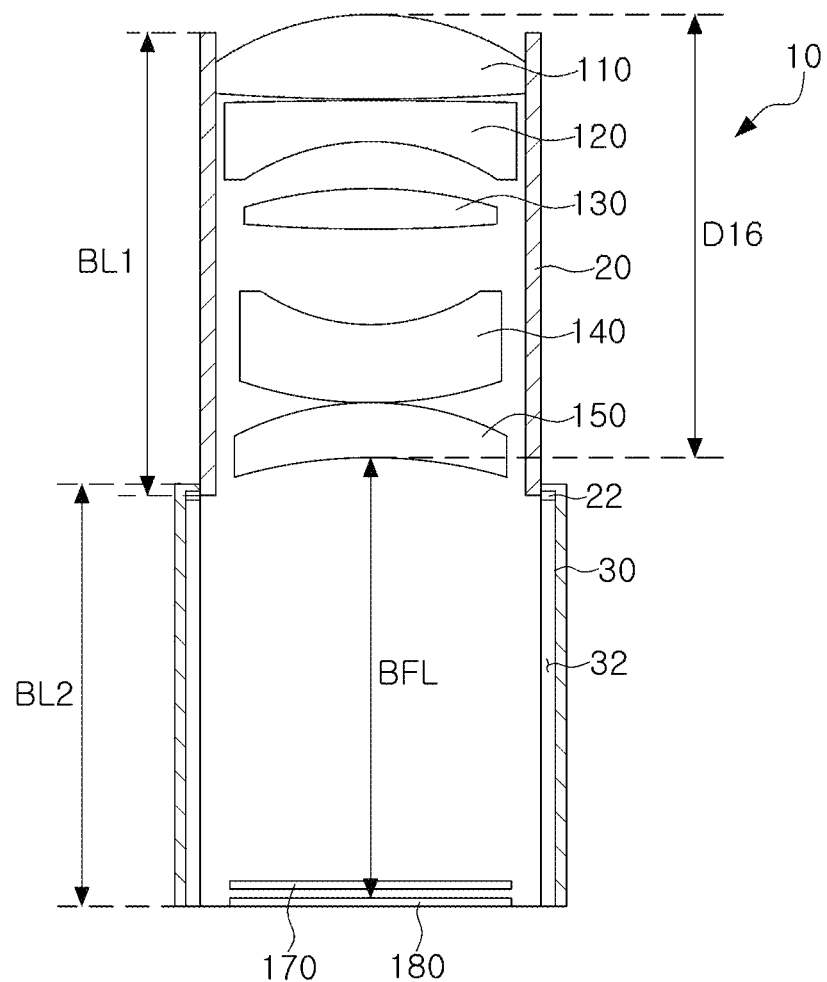
FIG. 2 is a configuration diagram of a camera module including the lens imaging system illustrated in FIG. 1.

The lens imaging system 100 may include a filter 170 and an image sensor 180. The filter 170 is disposed between the fifth lens 150 and the image sensor 180. The filter 170 is configured to block light of a specific wavelength from incident light. The image sensor 180 is disposed on an image A camera module including the lens imaging system 100 will be described with reference to FIGS. 2 and 3.

A camera module 10 includes the lens imaging system 100 and lens barrels 20 and 30. However, the configuration of the camera module 10 is not limited to the lens imaging system 100 and the lens barrels 20 and 30. For example, the camera module 10 may further include a driving mechanism for driving the lens imaging system 100 or the lens barrels 20 and 30.

The lens barrels 20 and 30 may be configured in plural. For example, the lens barrels 20 and 30 may be comprised of the first lens barrel 20 and the second lens barrel 30. The first lens barrel 20 is configured to accommodate a partial configuration of the lens imaging system 100. For example, the first lens barrel 20 may be configured to accommodate the lenses 110, 120, 130, 140, and 150 of the lens imaging system 100. The first lens barrel 20 has a predetermined length BL1. For example, the length BL1 of the first lens barrel 20 may be greater than a distance D16 from the object side surface of the first lens 110 to the image side surface of the fifth lens 150. The second lens barrel 30 is configured to accommodate a remaining configuration of the lens imaging system 100. For example, the second lens barrel 30 may be configured to accommodate the filter 170 and the image sensor 180 of the lens imaging system 100. The second lens barrel 30 has a predetermined length BL2. For example, the length BL2 of the second lens barrel 30 may be greater than the distance BFL from the image side surface of the fifth lens to the imaging surface of the image sensor 180.

Figure 3:
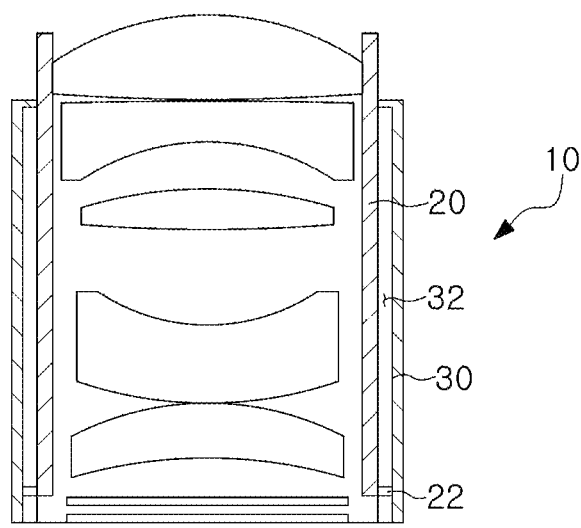
FIG. 3 is a storage state diagram of the camera module illustrated in FIG. 2.

The first lens barrel 20 may be accommodated inside the second lens barrel 30. For example, the first lens barrel 20 may be completely accommodated in the second lens barrel 30 as shown in FIG. 3 so that an overall height of the camera module 10 may be reduced. A protrusion 22 and a guide groove 32 are formed in the first lens barrel 20 and the second lens barrel 30, respectively. For example, one or more protrusions 22 are formed on an outer circumferential surface of the first lens barrel 20, and the same number of guide grooves 32 are formed on an inner circumferential surface of the second lens barrel 30. The guide groove 32 is formed to be elongated in a longitudinal direction of the second lens barrel 30. The protrusion 22 of the first lens barrel 20 is fitted into the guide groove 32 of the second lens barrel 30.

The first lens barrel 20 and the second lens barrel 30 may be coupled to each other by the protrusion 22 and the guide groove 32. The first lens barrel 20 may move in the optical axis direction along the inner circumferential surface of the second lens barrel 30. For example, the first lens barrel 20 may freely move in the optical axis direction through the protrusion 22 coupled with the guide groove 32.

The camera module 10 configured as described above may be easily mounted to the portable terminal since the height of the camera module 10 is adjusted by the plurality of lens barrels 20 and 30.

Figure 4:
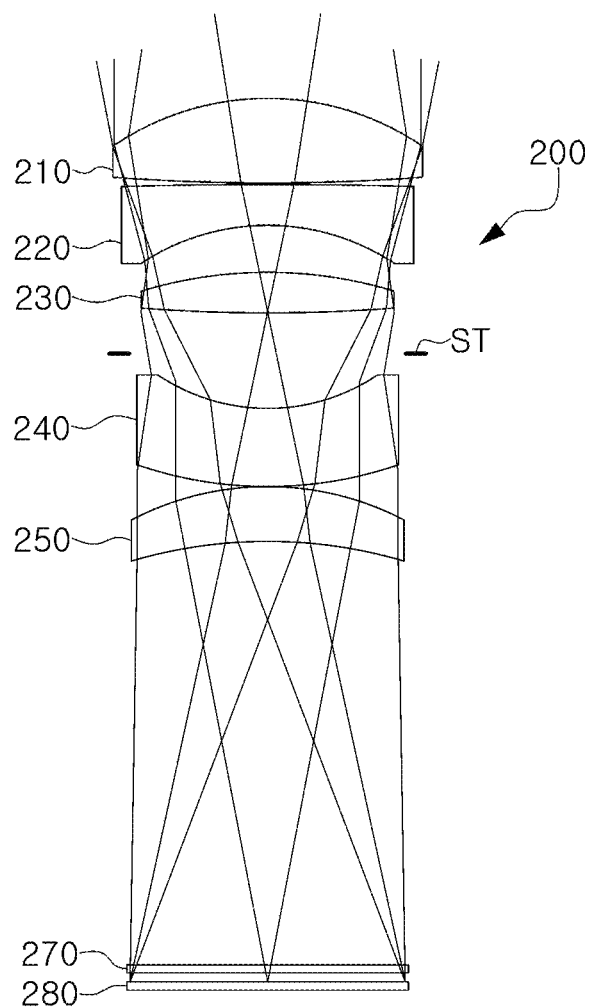
FIG. 4 is a configuration diagram of a lens imaging system according to another example.

A lens imaging system according to a second example will be described with reference to FIG. 4.

A lens imaging system 200 includes a first lens 210, a second lens 220, a third lens 230, a fourth lens 240, and a fifth lens 250.

The first lens 210 has positive refractive power. The first lens 210 has a convex shape on an object side surface and a convex shape on an image side surface. The second lens 220 has negative refractive power. The second lens 220 has a convex shape on an object side surface and a concave shape on an image side surface. The third lens 230 has positive refractive power. The third lens 230 has a convex shape on an object side surface and a concave shape on an image side surface. The fourth lens 240 has negative refractive power. The fourth lens 240 has a concave shape on an object side surface and a convex shape on an image side surface. The fifth lens 250 has positive refractive power. The fifth lens 250 has a convex shape on an object side surface and a concave shape on an image side surface.

The first lens 210 may be the thickest lens in the lens imaging system 200. For example, the thickness at the center of the first lens 210 along the optical axis may be greater than the thickness at the center of the second lens 220 to the fifth lens 250 along the optical axis.

The lens imaging system 200 may include a filter 270 and an image sensor 280. The filter 270 is disposed between the fifth lens 250 and the image sensor 280. The filter 270 is configured to block light of a specific wavelength from incident light. For example, the filter may be configured to block light of infrared wavelengths. The image sensor 280 is disposed on the image side of the filter 270. The image sensor 280 is configured to convert an optical signal into an electrical signal.

Table 3 shows lens characteristics of the lens imaging system 200, and Table 4 shows aspherical values of the lens imaging system 200.

TABLE 3

| Surface No. | Reference | Radius of curvature | Thickness/ distance | Focal length | Refractive index | Abbe number |
|---|---|---|---|---|---|---|
| 0 | Object | infinity | infinity | | | |
| 1 | First lens | 4.459 | 1.84752 | 7.98272 | 1.5350 | 56.00 |
| 2 | | −92.924 | 0.06000 | | | |
| 3 | Second lens | 9.434 | 1.11825 | −8.79211 | 1.6150 | 25.90 |
| 4 | | 3.300 | 1.00000 | | | |
| 5 | Third lens | 25.068 | 0.55279 | 46.09704 | 1.6600 | 20.40 |
| 6 | | 133.042 | 1.60000 | | | |
| 7 | Fourth lens | −3.300 | 1.40000 | 21.86904 | 1.6150 | 25.90 |
| 8 | | −4.944 | 0.04000 | | | |
| 9 | Fifth lens | 3.690 | 1.15477 | 17.19018 | 1.5350 | 56.00 |
| 10 | | 5.336 | 7.20242 | | | |
| 11 | Filter | infinity | 0.11000 | | 1.5441 | 56.00 |
| 12 | | infinity | 0.76999 | | | |
| 13 | Imaging surface | infinity | 0.00154 | | | |

TABLE 4

| Surface No. | K | A | B | C | D | E | F | G | H | I |
|---|---|---|---|---|---|---|---|---|---|---|
| 1 | −0.61719 | 0.000834 | 2.29E−05 | 3.42E−06 | −3.26E−07 | 2.57E−08 | 0.00E+00 | 0.00E+00 | 0 | 0 |
| 2 | 0 | 6.36E−05 | −5.48E−06 | 3.86E−06 | −5.93E−07 | 3.83E−08 | 0.00E+00 | 0.00E+00 | 0 | 0 |
| 3 | 0 | −0.00402 | 0.000139 | −8.18E−06 | 2.67E−07 | 0.00E+00 | 0.00E+00 | 0.00E+00 | 0 | 0 |
| 4 | 0 | −0.00538 | 0.000447 | −3.21E−05 | −3.62E−06 | 0.00E+00 | 0.00E+00 | 0.00E+00 | 0 | 0 |
| 5 | 0 | 0.000891 | 0.002096 | −0.0004 | 3.31E−05 | 0.00E+00 | 0.00E+00 | 0.00E+00 | 0 | 0 |
| 6 | 0 | 0.000369 | 0.001905 | −0.00071 | 9.12E−05 | −6.74E−06 | 0.00E+00 | 0.00E+00 | 0 | 0 |
| 7 | 0 | 0.021828 | −0.00568 | 0.001048 | −9.85E−05 | −9.86E−07 | 0.00E+00 | 0.00E+00 | 0 | 0 |
| 8 | −4.42031 | 0.001103 | −0.0006 | 0.000276 | −1.84E−05 | −4.72E−07 | 0.00E+00 | 0.00E+00 | 0 | 0 |
| 9 | 0 | −0.01472 | 0.002374 | −0.00016 | 3.23E−06 | 5.72E−08 | 0.00E+00 | 0.00E+00 | 0 | 0 |
| 10 | 0 | −0.00666 | 8.35E−04 | −2.38E−05 | 5.08E−06 | −1.68E−07 | 0.00E+00 | 0.00E+00 | 0 | 0 |

Figure 5:
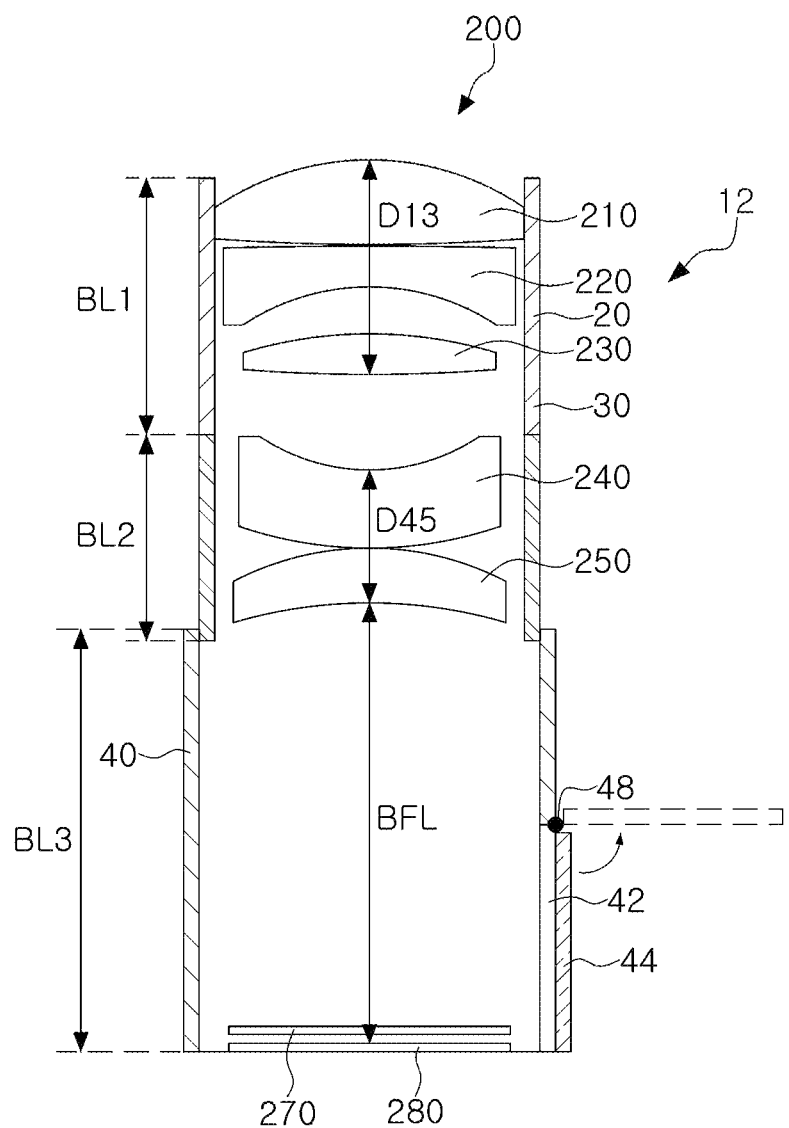
FIG. 5 is a configuration diagram of a camera module including the lens imaging system illustrated in FIG. 4.
Figure 6A:
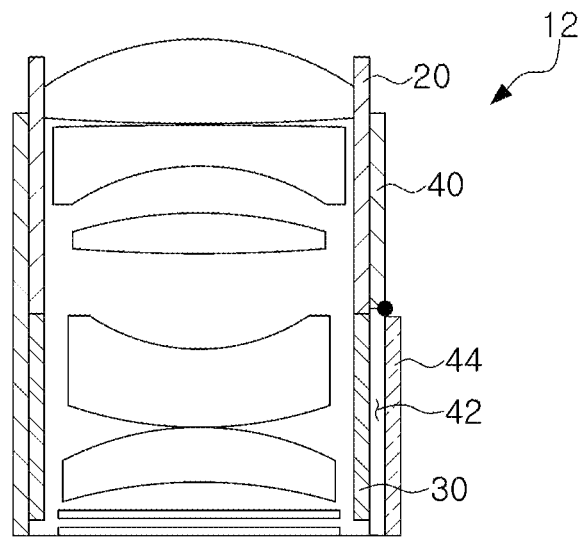
FIGS. 6A and 6B are storage state diagrams of the camera module illustrated in FIG. 5.
Figure 6B:
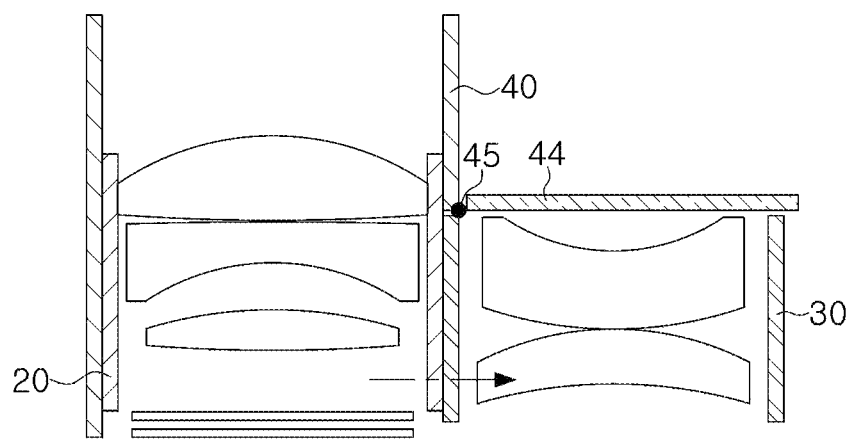

Next, a camera module including the lens imaging system 200 will be described with reference to FIGS. 5, 6A, and 6B.

The camera module 12 includes a lens imaging system 200 described above and lens barrels 20, 30, and 40.

However, the configuration of the camera module 12 is not limited to the lens imaging system 200 and the lens barrels 20, 30, and 40. For example, the camera module 12 may further include a driving mechanism for driving the lens imaging system 200 or the lens barrels 20, 30, and 40.

The lens barrels 20, 30, and 40 may be configured in plural. For example, the lens barrels 20, 30, and 40 may be comprised of the first lens barrel 20, the second lens barrel 30, and the third lens barrel 40. The first lens barrel 20 may be configured to accommodate a partial configuration of the lens imaging system 200. For example, the first lens barrel 20 may be configured to accommodate lenses 210, 220, and 230 of the lens imaging system 200. The first lens barrel 20 has a predetermined length BL1. For example, the length BL1 of the first lens barrel 20 may be greater than a distance D13 from the object side surface of the first lens 210 to the image side surface of the third lens 230. The second lens barrel 30 is configured to accommodate the remaining lenses of the lens imaging system 200. For example, the second lens barrel 30 may be configured to accommodate the fourth lens 240 and the fifth lens 250. The second lens barrel 30 has a predetermined length BL2. For example, the length BL2 of the second lens barrel 30 may be greater than a distance D45 from the object side surface of the fourth lens 240 to the image side surface of the fifth lens 250. The third lens barrel 40 may accommodate the remaining configurations of the lens imaging system 200. For example, the third lens barrel 40 may be configured to accommodate the filter 170 and the image sensor 180 of the lens imaging system 200. The third lens barrel 40 has a predetermined length BL3. For example, the length BL3 of the third lens barrel 40 may be greater than a distance BFL from the image side surface of the fifth lens 250 to an imaging surface of the image sensor 280.

The first lens barrel 20 and the second lens barrel 30 are configured to be accommodated in the third lens barrel 40. For example, the first lens barrel 20 and the second lens barrel 30 may be completely accommodated inside the third lens barrel 40 in an inactive state of the camera module 12.

Optionally, the second lens barrel 30 may be configured to be disposed outwardly of the third lens barrel 40. For example, the second lens barrel 30 may be disposed outwardly of the third lens barrel 40 through an opening 42 of the third lens barrel 40. The opening 42 is formed on one side of the third lens barrel 40. The third lens barrel 40 may include a cover 44 for selectively opening and closing the opening 42. The cover 44 may be coupled to the third lens barrel 40 by a hinge member 48.

Figure 7:
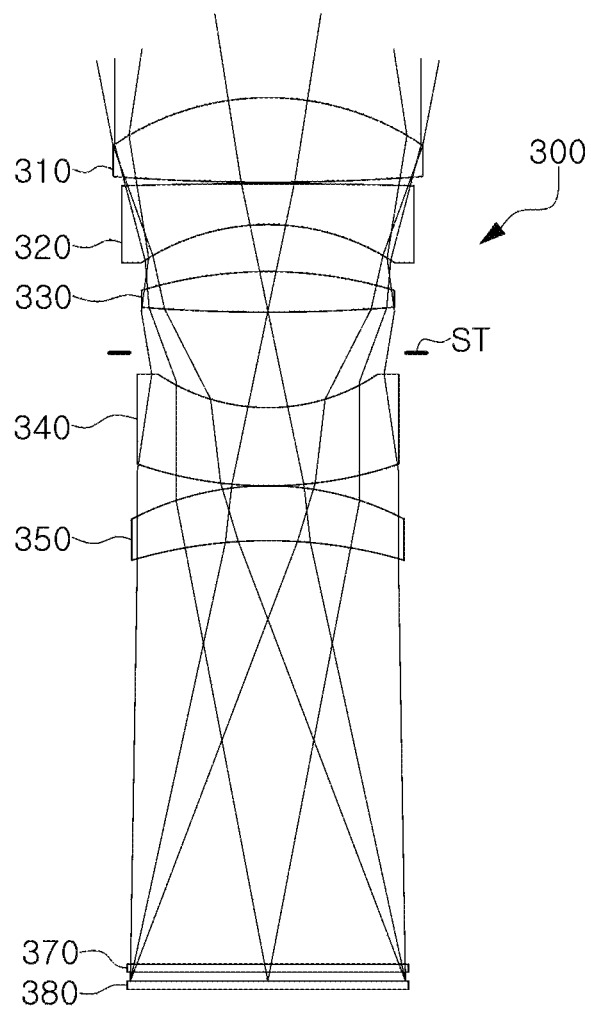
FIG. 7 is a configuration diagram of a lens imaging system according to another example.

A lens imaging system according to a third example will be described with reference to FIG. 7.

A lens imaging system 300 include a first lens 310, a second lens 320, a third lens 330, a fourth lens 340, and a fifth lens 350.

The first lens 310 has positive refractive power. The first lens 310 has a convex shape on an object side surface and a convex shape on an image side surface. The second lens 320 has negative refractive power. The second lens 320 has a convex shape on an object side surface and a concave shape on an image side surface. The third lens 330 has positive refractive power. The third lens 330 has a convex shape on an object side surface and a concave shape on an image side surface. The fourth lens 340 has negative refractive power. The fourth lens 340 has a concave shape on an object side surface and a convex shape on an image side surface. The fifth lens 350 has positive refractive power. The fifth lens 350 has a convex shape on an object side surface and a concave shape on an image side surface.

The first lens 310 may be the thickest lens in the lens imaging system 300. For example, the thickness at a center of the first lens 310 along the optical axis may be greater than the thickness of the second lens 320 to the fifth lens 350 at a center along the optical axis.

The lens imaging system 300 may include a filter 370 and an image sensor 380. The filter 370 is disposed between the fifth lens 350 and the image sensor 380. The filter 370 is configured to block light of a specific wavelength from incident light. For example, the filter 370 may be configured to block light of infrared wavelengths. The image sensor 380 is disposed on an image side of the filter 370. The image sensor 380 is configured to convert an optical signal into an electrical signal.

Table 5 shows lens characteristics of the lens imaging system 300, and Table 6 shows aspherical values of the lens imaging system 300.

TABLE 5

| Surface No. | Reference | Radius of curvature | Thickness/ distance | Focal length | Refractive index | Abbe number |
|---|---|---|---|---|---|---|
| 0 | Object | infinity | infinity | | | |
| 1 | First lens | 4.463 | 1.94240 | 8.04964 | 1.5350 | 56.00 |
| 2 | | −113.792 | 0.04374 | | | |
| 3 | Second lens | 8.755 | 1.06248 | −9.22173 | 1.6150 | 25.90 |
| 4 | | 3.300 | 1.00000 | | | |
| 5 | Third lens | 26.295 | 0.52045 | 88.81893 | 1.6600 | 20.40 |
| 6 | | 46.871 | 1.60000 | | | |
| 7 | Fourth lens | −3.300 | 1.40000 | −25.88373 | 1.6150 | 25.90 |
| 8 | | −4.723 | 0.04000 | | | |
| 9 | Fifth lens | 3.703 | 1.18153 | 17.46759 | 1.5350 | 56.00 |
| 10 | | 5.312 | 7.26707 | | | |
| 11 | Filter | infinity | 0.11000 | | 1.5441 | 56.00 |
| 12 | | infinity | 0.73945 | | | |
| 13 | Imaging surface | infinity | 0.00055 | | | |

TABLE 6

| Surface No. | K | A | B | C | D | E | F | G | H | I |
|---|---|---|---|---|---|---|---|---|---|---|
| 1 | −0.61371 | 0.000831 | 3.13E−05 | 2.88E−06 | −3.61E−07 | 3.96E−08 | 0.00E+00 | 0.00E+00 | 0 | 0 |
| 2 | 0 | 8.96E−05 | 4.59E−06 | 3.74E−06 | −7.67E−07 | 7.15E−08 | 0.00E+00 | 0 | 0 | 0 |
| 3 | 0 | −0.00398 | 0.000133 | −1.00E−05 | 4.31E−07 | 0.00E+00 | 0.00E+00 | 0 | 0 | 0 |
| 4 | 0 | −0.00522 | 0.000513 | −6.36E−05 | 1.26E−06 | 0.00E+00 | 0.00E+00 | 0 | 0 | 0 |
| 5 | 0 | 0.000659 | 0.00261 | −6.26E−04 | 6.66E−05 | 0.00E+00 | 0.00E+00 | 0 | 0 | 0 |
| 6 | 0 | 0.000396 | 0.002585 | −9.87E−04 | 1.25E−04 | −5.35E−06 | 0.00E+00 | 0 | 0 | 0 |
| 7 | 0 | 0.02093 | −0.00506 | 8.04E−04 | −6.69E−05 | −8.87E−07 | 0.00E+00 | 0 | 0 | 0 |
| 8 | −3.83206 | 0.000683 | −0.00048 | 0.000182 | −4.13E−06 | −9.41E−07 | 0.00E+00 | 0 | 0 | 0 |

TABLE 6-continued

| Surface No. | K | A | B | C | D | E | F | G | H | I |
|---|---|---|---|---|---|---|---|---|---|---|
| 9 | 0 | −0.01398 | 0.00217 | −0.00015 | 3.68E−06 | 2.01E−08 | 0.00E+00 | 0 | 0 | 0 |
| 10 | 0 | −0.00653 | 0.000817 | −1.81E−05 | 2.57E−06 | 8.59E−08 | 0.00E+00 | 0 | 0 | 0 |

Table 7 shows optical property values of the lens imaging system according to the first to third examples.

TABLE 7

| Reference | First example | Second example | Third example |
|---|---|---|---|
| TTL | 16.805 | 16.857 | 16.908 |
| BFL | 8.183 | 8.084 | 8.117 |
| f | 15.00 | 15.00 | 15.00 |
| F-number | 2.800 | 2.800 | 2.800 |
| 2ImgHT | 8.000 | 8.000 | 8.000 |

TABLE 8

| Conditional expression | First example | Second example | Third example |
|---|---|---|---|
| TTL/BFL | 2.0536 | 2.0853 | 2.0830 |
| L1R2/f | −5.6735 | −6.1949 | −7.5861 |
| (L1R1 + L1R2)/(L1R1 − L1R2) | −0.9006 | −0.9084 | −0.9245 |
| L2R2/f | 0.2200 | 0.2200 | 0.2200 |
| (L2R1 + L2R2)/(L1R1 − L2R2) | 2.0928 | 2.0760 | 2.2098 |
| f/f1 | 1.8913 | 1.8791 | 1.8634 |
| f/f3 | 0.4183 | 0.3254 | 0.1689 |
| f/f4 | −0.7774 | −0.6859 | −0.5795 |
| f/f5 | 0.8640 | 0.8726 | 0.8587 |
| BFL/2ImgHT | 1.0229 | 1.0105 | 1.0146 |
| f/2ImgHT | 1.8750 | 1.8750 | 1.8750 |
| TTL/f | 1.1203 | 1.1238 | 1.1272 |
| (TTL − BFL)/BFL | 1.0536 | 1.0853 | 1.0830 |
| D23/D34 | 0.6250 | 0.6250 | 0.6250 |
| FOV | 29.460 | 29.460 | 29.500 |

Figure 8:
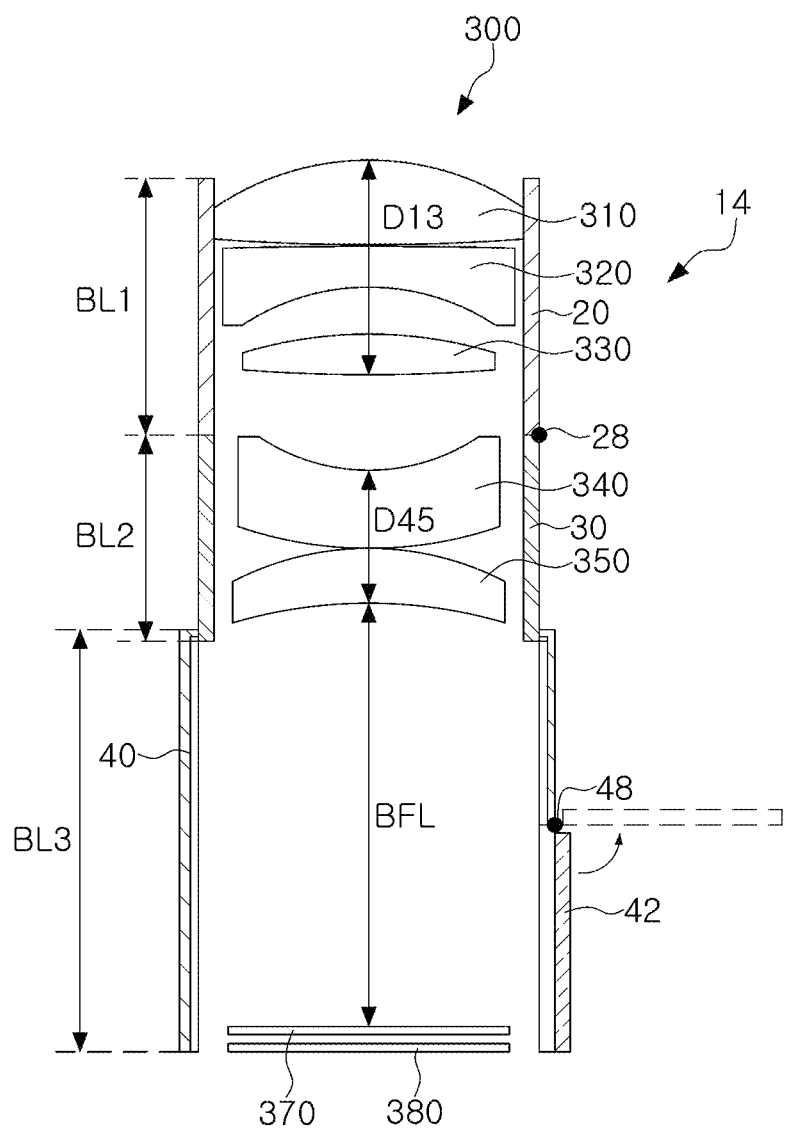
FIG. 8 is a configuration diagram of a camera module including the lens imaging system illustrated in FIG. 7.
Figure 9A:
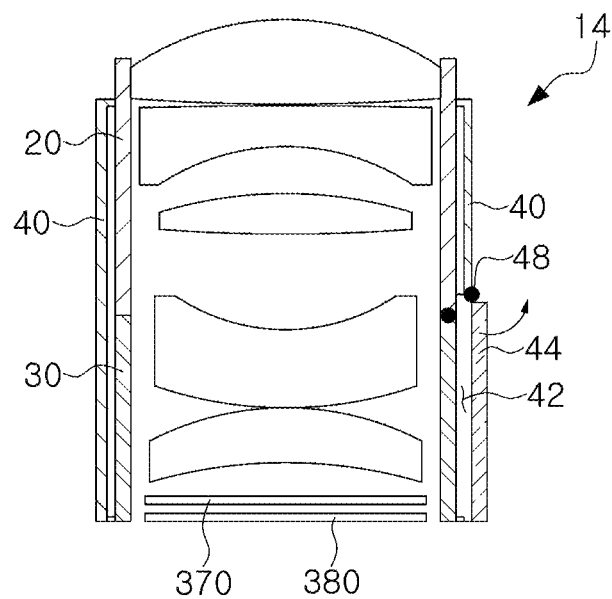
FIGS. 9A and 9B are storage state diagrams of the camera module illustrated in FIG. 8.
Figure 9B:
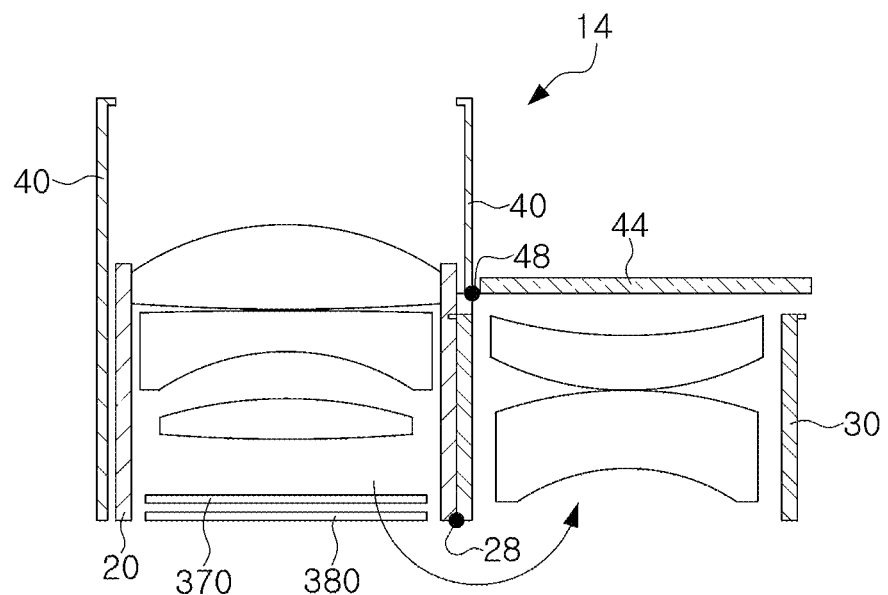

Next, a camera module including the lens imaging system 300 will be described with reference to FIGS. 8, 9A, and 9B.

The camera module 14 includes the lens imaging system described above 300 and lens barrels 20, 30, and 40. However, the configuration of the camera module 14 is not limited to the lens imaging system 300 and the lens barrels 20, 30, and 40. For example, the camera module 10 may further include a driving mechanism for driving the lens imaging system 300 or the lens barrels 20, 30, and 40.

The lens barrels 20, 30, and 40 may be configured in plural. For example, the lens barrels 20, 30, and 40 may include the first lens barrel 20, the second lens barrel 30, and the third lens barrel 40. The first lens barrel 20 may be configured to accommodate a partial configuration of the lens imaging system 300. For example, the first lens barrel 20 may be configured to accommodate lenses 310, 320, and 330 of the lens imaging system 300. The first lens barrel 20 has a predetermined length BL1. For example, the length BL1 of the first lens barrel 20 may be greater than a distance D13 from the object side surface of the first lens 310 to the image side surface of the third lens 330. The second lens barrel 30 is configured to accommodate the remaining lenses of the lens imaging system 300. For example, the second lens barrel 30 may be configured to accommodate the fourth lens 340 and the fifth lens 350. The second lens barrel 30 has a predetermined length BL2. For example, the length BL2 of the second lens barrel 30 may be greater than a distance D45 from the object side surface of the fourth lens 340 to the image side surface of the fifth lens 350. The third lens barrel 40 may accommodate the remaining configurations of the lens imaging system 300. For example, the third lens barrel 40 may be configured to accommodate the filter 370 and the image senor 380 of the lens imaging system 300. The third lens barrel 40 has a predetermined length BL3. For example, the length BL3 of the third lens 40 may be greater than the distance BFL from the image side surface of the fifth lens 350 to the imaging surface of the image sensor 380.

The first lens barrel 20 and the second lens barrel 30 are configured to be accommodated in the third lens barrel 40. For example, the first lens barrel 20 and the second lens barrel 30 may be completely accommodated inside the third lens barrel 40 in an inactive state of the camera module 14.

Optionally, the second lens barrel 30 may be configured to be disposed outwardly of the third lens barrel 40. For example, the second lens barrel 30 may be disposed outwardly of the third lens barrel 40 through an opening 42 of the third lens barrel 40. The opening 42 is formed on one side of the third lens barrel 40. The third lens barrel 40 may include a cover 44 for selectively opening and closing the opening 42. The cover 44 may be coupled to the third lens barrel 40 by a hinge member 48.

The second lens barrel 30 may be coupled to the first lens barrel 20 by a hinge member 28. Therefore, the second lens barrel 30 may be rotate around the hinge member 28, and may be disposed in an up-and-down inverted state, as shown in FIG. 9B, while being carried out through the opening 42.

As set forth above, according to the examples, a lens imaging system and a camera module capable of high magnification imaging may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A lens imaging system, disposed sequentially from an object side, comprising:
 a first lens having positive refractive power and comprising a convex image-side surface,
 a second lens having refractive power and comprising a convex object-side surface;

a third lens having positive refractive power, and comprising a concave image-side surface;
a fourth lens having negative refractive power; and
a fifth lens having refractive power,
wherein TTL, a distance from an object-side surface of the first lens to an imaging surface, and BFL, a distance from an image-side surface of the fifth lens to the imaging surface, satisfy 1.0<TTL/BFL<3.0.

2. The lens imaging system of claim 1, wherein the third lens comprises a convex object-side surface.

3. The lens imaging system of claim 1, wherein the fifth lens comprises a concave image-side surface.

4. The lens imaging system of claim 1, wherein a radius of curvature of an image side surface of the first lens L1R2 and a focal length f of the lens imaging system satisfy −10<L1R2/f<−2.0.

5. The lens imaging system of claim 1, wherein a radius of curvature of the object-side surface of the first lens L1R1 and a radius of curvature of an image-side surface of the first lens L1R2 satisfy −2.0<(L1R1+L1R2)/(L1R1−L1R2)<−0.1.

6. The lens imaging system of claim 1, wherein a radius of curvature of an image side surface of the second lens L2R2 and a focal length f of the lens imaging system satisfy 0.1<L2R2/f<2.0.

7. The lens imaging system of claim 1, wherein a radius of curvature of an object side surface of the second lens L2R1 and a radius of curvature of an image side surface of the second lens L2R2 satisfy 0.1<(L2R1+L2R2)/(L2R1−L2R2)<5.0.

8. The lens imaging system of claim 1, wherein the BFL and a diagonal length 2 ImgHT of the imaging surface satisfy 1.0<BFL/2 ImgHT.

9. The lens imaging system of claim 1, wherein a total field of view (FOV) is 35 degrees or less.

10. The lens imaging system of claim 1, wherein a focal length f of the lens imaging system and a diagonal length 2 ImgHT of the imaging surface satisfy 1.6<f/2 ImgHT.

11. The lens imaging system of claim 1, wherein the fifth lens has positive refractive power.

12. The lens imaging system of claim 1, wherein a focal length of the fourth lens is in a range of −30 mm to −15 mm.

13. A camera module, comprising:
a first barrel comprising a lens imaging system; and
a second barrel coupled to the first barrel, and comprising an image sensor,
wherein the first barrel is configured to be accommodated inside the second barrel in an optical axis direction of the lens imaging system,
wherein the lens imaging system comprises:
a first lens having positive refractive power and comprising a convex image-side surface;
a second lens having refractive power and comprising a convex object-side surface;
a third lens having positive refractive power, and comprising a concave image-side surface;
a fourth lens having negative refractive power; and
a fifth lens having refractive power, and
wherein TTL, a distance from an object-side surface of the first lens to an imaging surface, and BFL, a distance from an image-side surface of the fifth lens to the imaging surface, satisfy 1.0<TTL/BFL<3.0.

14. The camera module of claim 13, wherein a length of the first barrel in the optical axis direction is greater than a distance from the object side surface of the first lens to the image side surface of the fifth lens.

15. A camera module, comprising:
a first lens barrel;
a second lens barrel coupled to an image side of the first barrel;
a lens imaging system accommodated within the first lens barrel and the second lens barrel, the lens imaging system comprising:
a first lens having refractive power and comprising a convex image-side surface,
a second lens having refractive power and comprising a convex object-side surface;
a third lens having refractive power;
a fourth lens having refractive power; and
a fifth lens having refractive power and a concave image-side surface; and
a third lens barrel comprising an image sensor, and configured to accommodate the first lens barrel and the second lens barrel therein,
wherein 1.0<TTL/BFL<3.0, where TTL is a distance from an object-side surface of the first lens to the image sensor and BFL is a distance from an image-side surface of the fifth lens to the image sensor, and
wherein the BFL and a diagonal length 2ImgHT of the image sensor satisfy 1.0<BFL/2ImgHT.

16. The camera module of claim 15, wherein the first lens, the second lens, and the third lens are accommodated in the first lens barrel, and the fourth lens and the fifth lens are accommodated in the second lens barrel.

17. The camera module of claim 15, wherein a length of the first lens barrel in an optical axis direction is greater than a distance from the object-side surface of the first lens to an image-side surface of the third lens.

18. The camera module of claim 15, wherein a length of the second lens barrel in an optical axis direction is greater than a distance from an object-side surface of the fourth lens to the image-side surface of the fifth lens.

19. The camera module of claim 15, wherein a length of the third lens barrel in an optical axis direction is greater than BFL.

* * * * *